(12) United States Patent
Devenyi et al.

(10) Patent No.: US 6,870,989 B1
(45) Date of Patent: Mar. 22, 2005

(54) METHOD FOR PERFORMING ADD/DROP FUNCTIONS OF LIGHT SIGNALS IN OPTICAL FIBER LIGHT TRANSMISSION SYSTEMS

(75) Inventors: Gabor Devenyi, Penetang (CA); Brien D. Ross, Wyevale (CA); James R. Whitty, Midland (CA)

(73) Assignee: Raytheon Company, Waltham, MA (US)

( * ) Notice: Subject to any disclaimer, the term of this patent is extended or adjusted under 35 U.S.C. 154(b) by 197 days.

(21) Appl. No.: 10/292,349

(22) Filed: Nov. 12, 2002

(51) Int. Cl.$^7$ .................................................. G02B 6/28
(52) U.S. Cl. ........................................ 385/39; 398/158
(58) Field of Search ............................. 385/39, 24, 47, 385/96; 398/158

(56) References Cited

U.S. PATENT DOCUMENTS

| | | | |
|---|---|---|---|
| 4,244,045 A | | 1/1981 | Nosu et al. |
| 4,904,043 A | | 2/1990 | Schweizer |
| 5,583,683 A | | 12/1996 | Scobey |
| 5,889,904 A | | 3/1999 | Pan et al. |
| 5,946,435 A | | 8/1999 | Zheng et al. |
| 6,285,810 B1 | * | 9/2001 | Fincato et al. ............. 385/24 |
| 6,647,175 B1 | * | 11/2003 | LoRegio et al. ........... 385/24 |
| 2002/0044721 A1 | * | 4/2002 | Bjorkllund |

* cited by examiner

Primary Examiner—John R. Lee
Assistant Examiner—Zia R. Hashmi
(74) Attorney, Agent, or Firm—William C. Schubert; Karl A. Vick

(57) ABSTRACT

Add/drop functions of light signals in an optical fiber light transmission system are performed using a group of bandpass light filters, wherein each of the group of bandpass light filters is operable to reflect a reflected wavelength band and transmit a transmitted wavelength band. A filter module is positioned to selectively place any of the group of bandpass light filters into a light path of the optical fiber light transmission system. A first add/drop function is accomplished by first positioning a first selected one of the bandpass light filters into the light path using a drive mechanism, directing the input light beam onto the first selected one of the bandpass light filters, performing the first add/drop function on the input light beam relative to a first band light signal in a first wavelength band, and removing the first selected one of the bandpass light filters from the light path using the drive mechanism. A second add/drop function is accomplished by second positioning a second selected one of the bandpass light filters into the light path using the drive mechanism, directing the input light beam onto the second selected one of the bandpass light filters, and performing the second add/drop function on the input light beam relative to a second-band light signal in a second wavelength band.

17 Claims, 3 Drawing Sheets

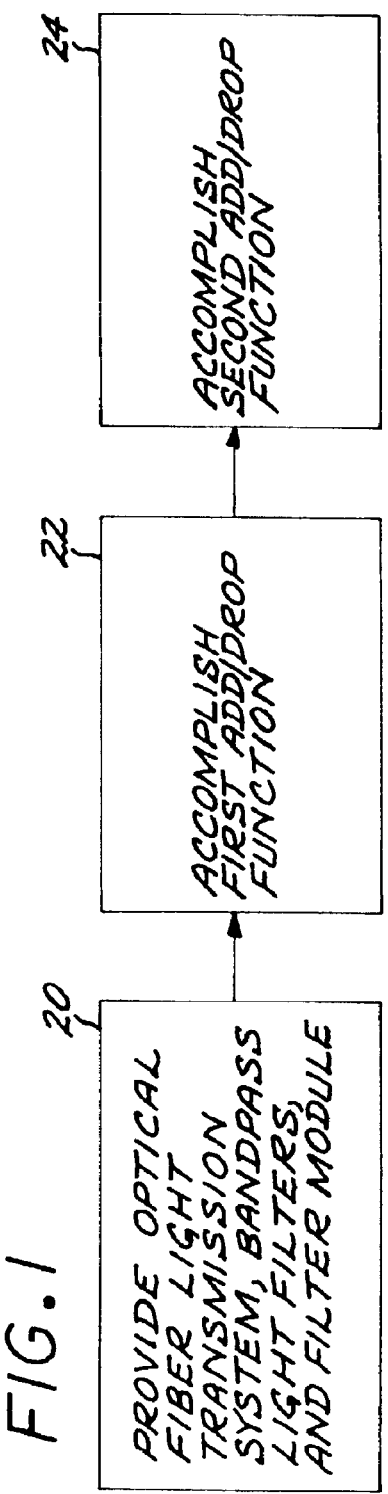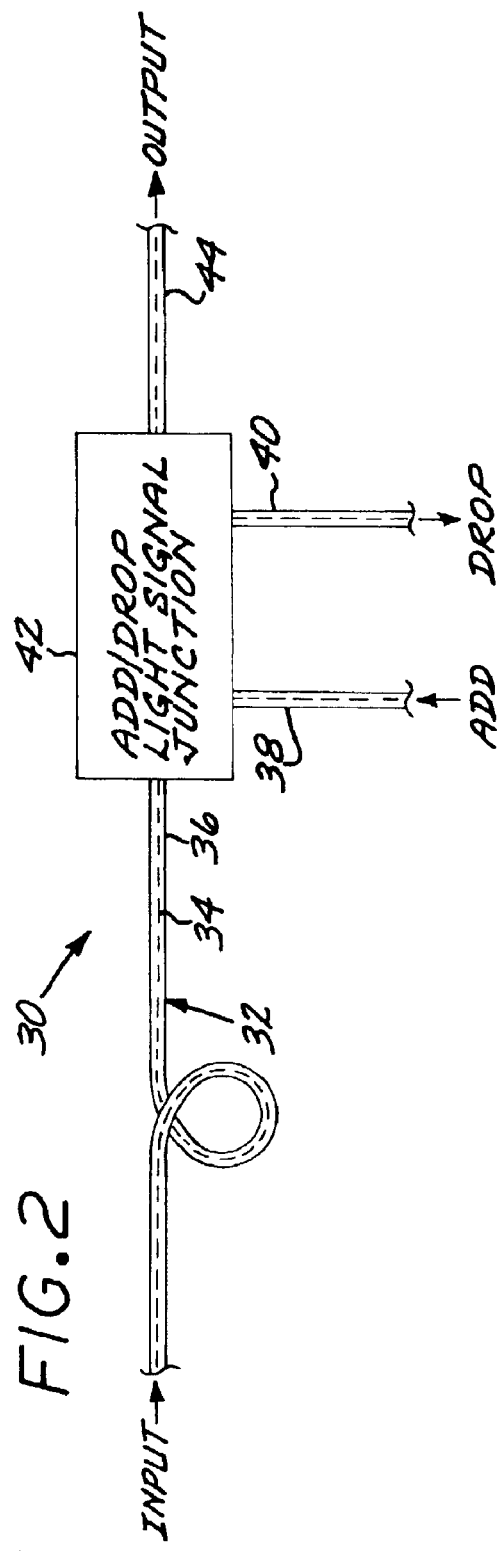

METHOD FOR PERFORMING ADD/DROP FUNCTIONS OF LIGHT SIGNALS IN OPTICAL FIBER LIGHT TRANSMISSION SYSTEMS

This invention relates to optical fiber light transmission systems and, more particularly, to the adding or dropping of light signals in selected wavelength bands with respect to a multichannel light beam.

BACKGROUND OF THE INVENTION

An optical fiber propagates light by total internal reflection. A light beam introduced into one end of the optical fiber is propagated essentially without any loss of energy to the other end of the optical fiber, even though the optical fiber may be quite long. This property of the optical fiber is utilized in light-based communication systems in which information is encoded onto a light beam, and the light beam is introduced into the optical fiber, propagated through the optical fiber, received at the other end of the optical fiber, and processed to recover the information. Because of its high frequency, the light beam may carry a great deal of information.

The capacity of the optical fiber to carry information may be further increased by simultaneously transmitting a number of light beams through the optical fiber. For example, a first-band light signal of a first wavelength (i.e., a first channel) may carry information for a first user, a second-band light signal of a second wavelength (i.e., a second channel) may carry information for a second user, and so on. The single optical fiber may carry a large number of such light signals, each in a slightly different wavelength band.

One of the practical problems of such an optical fiber light transmission system carrying many light signals in different wavelength bands is that the light signals must be added to or dropped from the main light beam as needed. That is, at a single location it may be necessary to add or drop the first-band light signal for a first period of time, and thereafter to add or drop the second-band light signal for a second period of time. Techniques are known for selectively performing the add/drop function, using tunable etalons, gratings, or graded thin-film coatings. However, these approaches are not fully satisfactory in that they are cumbersome, have high insertion loss, and have limited selectivity and channel isolation for wavelength bands.

There is therefore a need for an improved approach to the add/drop function in such optical fiber light transmission systems. The present invention fulfills this need, and further provides related advantages.

SUMMARY OF THE INVENTION

The present invention provides an approach for performing the add/drop function of light signals in various wavelength bands, at a single location. The approach utilizes bandpass light filters that are optimized for each particular wavelength band of interest. As a result, there is a low insertion loss for each light signal as well as good isolation and selectivity of the wavelength bands of interest.

In accordance with the invention, a method for performing add/drop functions of light signals in an optical fiber light transmission system comprises the steps of providing the optical fiber light transmission system having a light path therethrough, a group of bandpass light filters, wherein each of the group of bandpass light filters is optically different from the other bandpass light filters and is operable to reflect a respective reflected wavelength band and transmit a respective transmitted wavelength band, and a filter module positioned to selectively place any of the group of bandpass light filters into the light path of the optical fiber light transmission system. The filter module comprises a movable support on which the group of bandpass light filters is mounted, and a drive mechanism operably connected to the movable support to controllably move a selected one of the bandpass light filters into the light path. The method further includes accomplishing a first add/drop function by first positioning a first selected one of the bandpass light filters into the light path using the drive mechanism, directing the input light beam onto the first one of the bandpass light filters, performing the first add/drop function on the input light beam relative to a first band light signal in a first wavelength band, and removing the first selected one of the bandpass light filters from the light path using the drive mechanism. A second add/drop function is accomplished by second positioning a second selected one of the bandpass light filters into the light path using the drive mechanism, directing the input light beam onto the second selected one of the bandpass light filters, and performing the second add/drop function on the input light beam relative to a second-band light signal in a second wavelength band. This approach may be employed in dense or coarse wavelength division multiplexed systems. The bandpass light filters are preferably thin-film optical bandpass filters.

The step of first positioning may include the step of selecting the first selected one of the bandpass light filters to pass the first wavelength band and reflect all other wavelengths. The step of performing the first add/drop function then includes the step of reflecting the input light beam from a first side of the first selected one of the bandpass light filters, so that the first-band light signal in the first wavelength band is transmitted through the first selected one of the bandpass light filters. A first reflected beam comprises all wavelengths of the input light beam except for the first-band light signal, thereby dropping the first-band light signal from the first reflected beam.

The step of first positioning may instead include the step of selecting the first selected one of the bandpass light filters to pass the first wavelength band and to reflect all other wavelengths. The step of performing the first add/drop function then includes the step of providing the input light beam not having therein the first-band light signal, reflecting the input light beam from a first side of the first selected one of the bandpass light filters to form a first reflected beam, and introducing the first-band light signal of the first wavelength band to a second side of the first selected one of the bandpass light filters. The first-band light signal is transmitted through the first selected one of the bandpass light filters and mixed with the first reflected beam, thereby adding the first-band light signal to the first reflected beam.

Similarly, the step of second positioning may include the step of selecting the second selected one of the bandpass light filters to pass the second wavelength band and reflect all other wavelengths. The step of performing the second add/drop function then includes the step of reflecting the input light beam from a first side of the second selected one of the bandpass light filters, so that the second-band light signal in the second wavelength band is transmitted through the second selected one of the bandpass light filters. A second reflected beam comprises all wavelengths of the input light beam except for the second-band light signal, thereby dropping the second-band light signal from the second reflected beam.

The step of second positioning may instead include the step of selecting the second selected one of the bandpass light filters to pass the second wavelength band and reflect all other wavelengths. The step of performing the second add/drop function then includes the step of providing the input light beam not having therein the second-band light signal, reflecting the input light beam from a first side of the second selected one of the bandpass light filters to form a second reflected beam, and introducing the second-band light signal of the second wavelength band to a second side of the second selected one of the bandpass light filters. The second-band light signal is transmitted through the second selected one of the bandpass light filters and mixed with the second reflected beam, thereby adding the second-band light signal to the second reflected beam.

The optical fiber light transmission system desirably includes a first light collimator and a second light collimator, with the light path extending between the first light collimator and the second light collimator. The filter module is positioned so that the selected one of the group of bandpass light filters may be controllably positioned in the light path between the first light collimator and the second light collimator.

Mechanically, the drive mechanism of the filter module preferably comprises a lead screw drivably connected to the movable support, and a stepper motor driving the lead screw. There may optionally be a positional indicating device for indicating the position of the movable support.

The present approach provides a selective add/drop function in an optical fiber light transmission system. The various bandpass filters are optimized for their respective wavelength bands, leading to low insertion loss and good efficiency. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is block flow diagram of a preferred approach for practicing the invention;

FIG. 2 is a schematic view of an optical fiber light transmission system having an add/drop function therein;

DETAILED DESCRIPTION OF THE INVENTION

Figure 3:
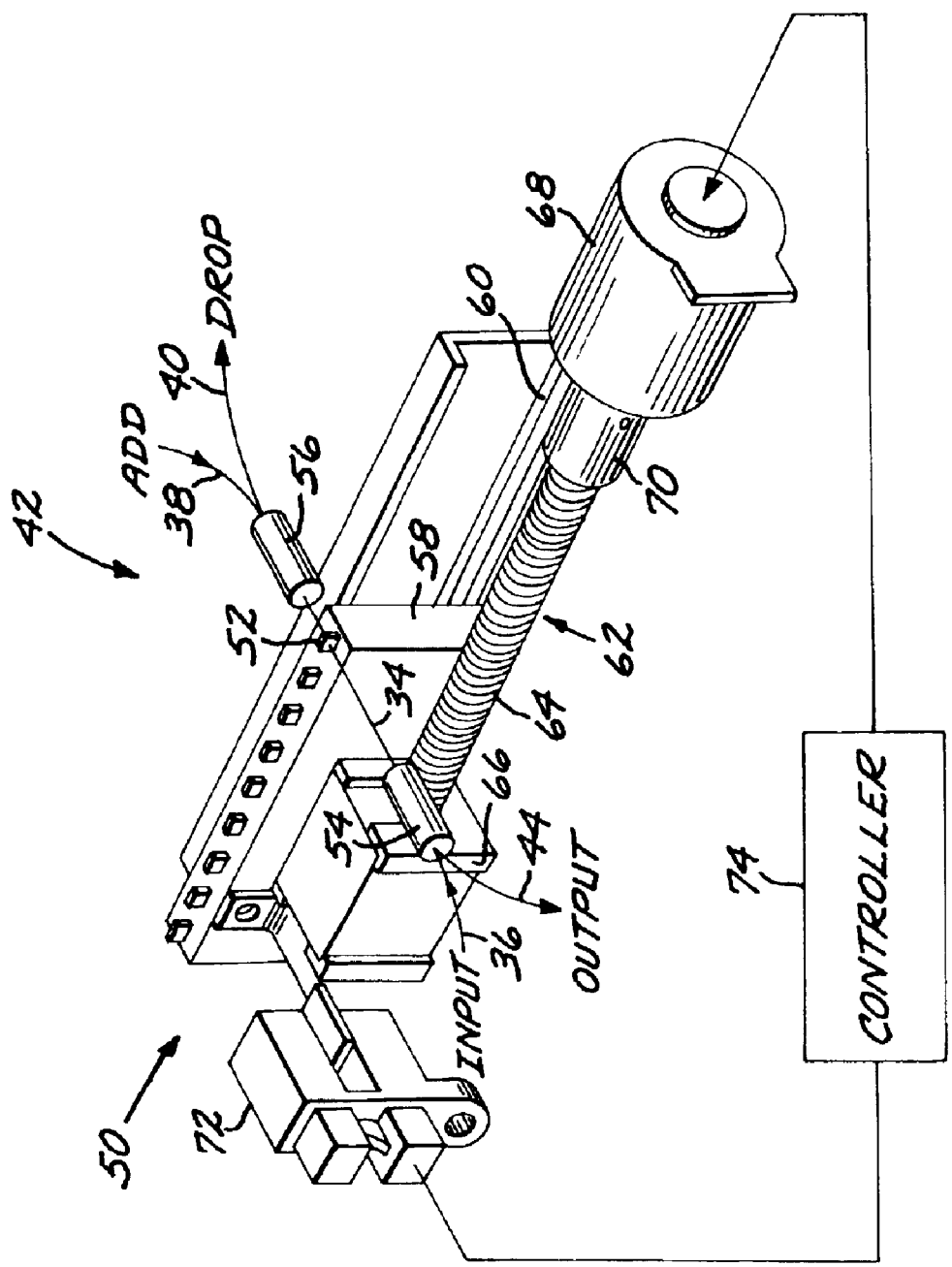
FIG. 3 is a perspective view of the preferred filter module.

FIG. 1 depicts a method for performing add/drop functions of light signals in an optical fiber light transmission system. The optical fiber light transmission system 30 is provided, numeral 20, having a light path therethrough, a group of bandpass light filters, and a filter module.

FIG. 2 depicts the optical fiber light transmission system 30 that may be of any operable type, but is typically an optical fiber communications network. The optical fiber light transmission system 30 includes an optical fiber 32 conducting a light path 34. The optical fiber 32 has various subparts. An input optical fiber 36 conducts the light path 34 that may carry one or more light signals, termed the mixed light signal, as the input light beam. At a location along the length of the optical fiber light transmission system 30, the mixed light signal carried by the optical fiber light transmission system 30 is modified by the addition of a new light signal or the dropping of one of the light signals previously part of the mixed light signal carried on the input optical fiber 36. A new light signal is added to the signal carried on the input optical fiber 36 through an add optical fiber 38, or the light signal is dropped from the light signal carried on the input optical fiber 32 through a drop optical fiber 40 at an add/drop light signal junction 42. At the add/drop light signal junction 42, a light signal may be added or may be dropped, or both an add and a drop may be accomplished. An output optical fiber 44 carries the modified light signal resulting from the add/drop function. The add/drop function is accomplished in a somewhat reciprocal fashion using the bandpass light filters, as will be discussed subsequently.

Stated equivalently, the input optical fiber 36 carries a number of channels of information on discrete wavelengths of light. A new channel may be added at a different wavelength of light, or one of the channels on the input optical fiber 36 may be dropped. The channels may be carried in a dense wavelength division multiplexing (DWDM) optical fiber communication system or a coarse wavelength division multiplexing (CWDM) optical fiber communication system. The wavelength or frequency spacing between the multiplexed wavelengths or frequencies is also termed the channel spacing. The channel spacing in DWDM is typically smaller than that in CDWM. Typically, the frequency channel spacing in DWDM is about 100 GHz, and the channel spacing in CWDM is about 400 GHz. For the present purposes, DWDM is taken to have a channel spacing of less than about 200 GHz, and CWDM is taken to have a channel spacing of 200 GHz or more.

FIG. 3 depicts a preferred embodiment of the structure of the add/drop light signal junction 42. A filter module 50 is positioned to selectively and controllably place a bandpass light filter 52 into the light path 34 of the optical fiber light transmission system 30 and remove the bandpass light filter 52 from the light path 34. The filter module 50 is positioned to place the bandpass light filter 52 into the light path 34 at a location between a first light collimator 54 and a second light collimator 56. The first light collimator 54 and the second light collimator 56 are depicted as dual-fiber light collimators, leading to a four-port configuration, in which the input optical fiber 36 and the output optical fiber 44 are mutually collimated at the first light collimator 54, and the add optical fiber 38 and the drop optical fiber 40 are mutually collimated at the second light collimator 56. Three-port configurations may also be provided. For example, if only an add function is to occur at the add/drop light signal junction 42, there would be only the add optical fiber 38 and no drop optical fiber 40. If only a drop function is to occur at the add/drop light signal junction 42, there would be only the drop optical fiber 40 and no add optical fiber 38. Both the add optical fiber 38 and the drop optical fiber 40 are illustrated in the four-port configuration of FIG. 3 for generality. Each dual-fiber light collimator may be equivalently replaced by two single-fiber light collimators in each case.

The filter module 50 comprises a movable support 58 upon which the bandpass light filters 52 are mounted. The bandpass light filters 52 are each discrete-wavelength-range light filters, which filter a fixed, specific range of wavelength and are not themselves otherwise controllable. The filtered range may be of any desired type for which a light filter may be prepared, such as a low-pass band, a high-pass band, or a central-pass band. Such bandpass light filters 52 are known in the art.

The movable support 58 in the illustrated embodiment is linearly movable on a linear bearing 60. A drive mechanism 62 is operably connected to the movable support 58 to controllably move the bandpass light filter 52 into and out of the light path 34. The drive mechanism 62 may be of any operable type. It preferably includes a lead screw 64 drivably connected to the movable support 58 through a drive nut 66. A controllable motor such as a stepper motor 68 with a rotating output 70 drives the lead screw 64, in turn driving the movable support 58 along the linear bearing 60. Equivalently, the controllable motor may be of any other operable type, such as a DC motor or a linear actuator.

Optionally but preferably, a positional indicating device 72 is provided in the drive mechanism 62 for indicating the position of the movable support 58. The stepper motor 68 moves the movable support to a selectable position, but the positional indicating device provides the position of the movable support 58 either continuously or at a fixed location such as an end point of the travel of the movable support. The output of the positional indicating device 72 provides backup information and also positional calibration information, and may be used as input to a motor controller 74 that controls the operation of the stepper motor 66. The motor controller 74 may operate in either this feedback mode or in a non-feedback mode based on the step positions of the stepper motor 68. The positional indicating device 72 may be of any operable type. One example is a switch that indicates a limit of travel of the movable support 58, such as a mechanical or optical limit switch. The positional indicating device 72 may instead indicate the position of the movable support all along its track on the linear bearing 60, such as with a linear potentiometer.

Figure 4:
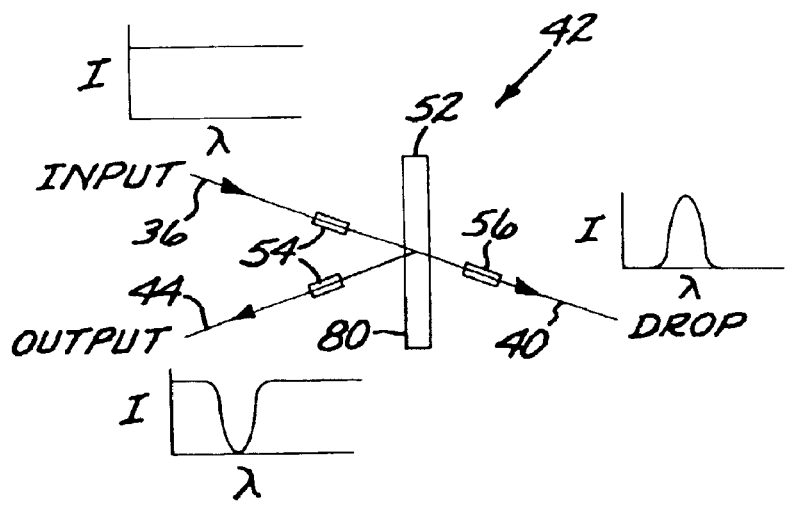
FIG. 4 is a schematic depiction of the operation of a bandpass light filter used in the drop mode.
Figure 5:
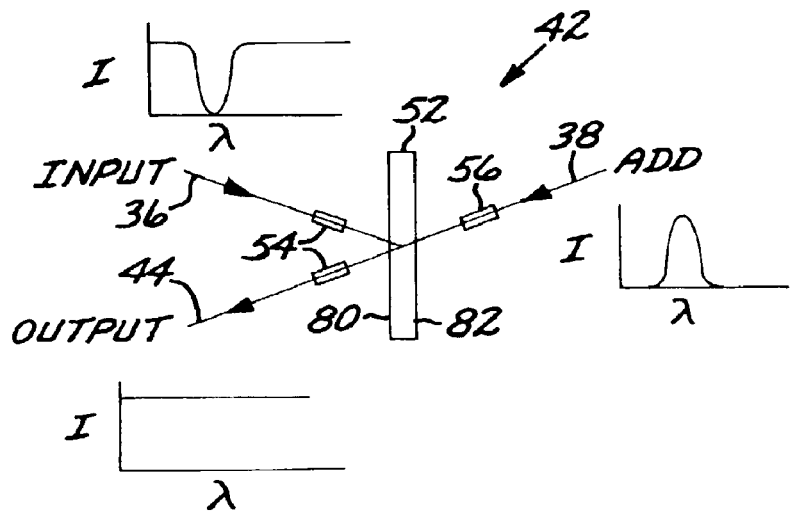
FIG. 5 is a schematic depiction of the operation of a bandpass light filter used in the add mode.

FIGS. 4–5 schematically illustrate the functioning of a thin-film bandpass light filter 52 in the add/drop light signal junction 42 and the filter module 50. In FIGS. 4–5, the light rays are illustrated, and also the schematic plot of light intensity I as a function of wavelength λ for each of the light rays. The pertinent property of the thin-film bandpass light filter 52 is that it transmits incident light of a bandpass wavelength range and reflects all other light. The transmitted bandpass wavelength range may be a low-pass band, a high-pass band, or a central-pass band. For the present application, a central-pass band is of most interest and is illustrated. Thin-film bandpass filters, their structure, and fabrication are known in the art and are used for other purposes. See, for example, U.S. Pat. Nos. 4,244,045 and 5,583,683, whose disclosures are incorporated by reference.

Referring to FIG. 4, which illustrates the light signal drop function, the input light beam carried on the input optical fiber 36 is illustrated as broadband and is incident upon a first side 80 of the thin-film bandpass light filter 52. The thin-film bandpass light filter 52 transmits a selected discrete wavelength range of a drop light signal, so that the reflected signal to the output optical fiber 44 carries the broadband light signal but with the drop light signal removed to the drop optical fiber 40.

Referring to FIG. 5, which illustrates the light signal add function, the input light beam carried on the input optical fiber 36 is illustrated as not including an add light signal. This input light signal incident upon the first side 80 is therefore reflected in its entirety from the thin-film bandpass light filter 52. The add light signal is provided on the add optical fiber 38 and is incident upon a second side 82 of the thin-film bandpass light filter. The add light signal is passed through the thin-film bandpass light filter 52 at the proper angle, and mixed into the reflected light signal and thence carried on the output optical fiber 44.

Returning to FIG. 1, a first add/drop function is accomplished using the filter module 50 at the add/drop light signal junction 42, numeral 22. This first add/drop function is performed using a first selected one of the thin-film bandpass light filters 52, positioned into the light path 34 by the operation of the drive mechanism 62. The add/drop function is performed in the manner illustrated in relation to FIGS. 4–5, and may involve adding the selected light signal or dropping the selected light signal. Two different light signals may be added or dropped with a single thin-film bandpass light filter 52 in some cases. The first selected one of the thin-film bandpass light filters is thereafter removed from the light path 34 by the drive mechanism 62.

A second add/drop function is thereafter accomplished using the filter module 50 at the add/drop light signal junction 42, numeral 24. This second add/drop function is performed using a second selected one of the thin-film bandpass light filters 52, positioned into the light path 34 by the operation of the drive mechanism 62. The add/drop function is performed in the manner illustrated in relation to FIGS. 4–5, and may involve adding the selected light signal or dropping the selected light signal. Two different light signals may be added or dropped with a single thin-film bandpass light filter 52 in some cases. The second selected one of the thin-film bandpass light filters is thereafter optionally removed from the light path 34 by the drive mechanism 62.

This accomplishing of the add/drop function may be repeated for the same or for different selected ones of the thin-film bandpass light filters 52.

In each of the add/drop functions 22 and 24, the selected thin-film bandpass light filter 52 is optimized for the particular add or drop function. The optimization includes minimizing insertion losses and achieving a precise selection of the desired light signal to be added or dropped. By comparison, alternative approaches such as tunable etalons, gratings, and graded thin-film coatings that are used with a number of different light wavelengths cannot be optimized for each particular light wavelength, at least at the current state of technology.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for performing add/drop functions of light signals in an optical fiber light transmission system, comprising the steps of
providing
an add/drop light signal junction having an input light path, an output light path, an add light path, and a drop light path,
a group of bandpass light filters, wherein each of the group of bandpass light filters is optically different from due other bandpass light filters and is operable to reflect a respective reflected wavelength band and transmit a respective transmitted wavelength band, and
a filter module positioned to selectively place any of the group of bandpass light filters into the add/drop light signal junction, the filter module comprising
a movable support on which the group of bandpass light filter is mounted, and
a drive mechanism operably connected to the movable support to controllably move a selected one of the bandpass light filters into the input light path;

accomplishing a first add/drop function by
    first positioning a first selected one of the bandpass light filters into the add/drop light signal junction using the drive mechanism,
    directing an input light beam on the input light path onto the first one of the bandpass light filters,
    performing the first add/drop function on the input light bean relative to a first band light signal in a first wavelength band, wherein the first add/drop function may be any one of a first light signal add, a first light signal drop, or both a first light signal add and a first light signal drop, and
    removing the first selected one of the bandpass light filters from the input light path using the drive mechanism; and thereafter
accomplishing a second add/drop function by
    second positioning a second selected one of the bandpass light filters into the add/drop light signal junction using the drive mechanism,
    directing the input light beam on the input light path onto the second selected one of the bandpass light filters, and
    performing the second add/drop function on the input light beam relative to a second-band light signal in a second wavelength band, wherein the second add/drop function may be any one of a second light signal add, a second light signal drop, or both a second light signal add and a second light signal drop.

2. The method of claim 1, wherein the step of providing the group of bandpass light filters includes the step of
    providing the group of bandpass light filters comprising thin-film light bandpass filters.

3. The method of claim 1, wherein the step of first positioning includes the step of
    selecting the first selected one of the bandpass light filters to pass the first wavelength band and reflect all other wavelengths, and
the step of performing the first add/drop function includes the step of
    reflecting the input light beam from a first side of the first selected one of the bandpass light filters, so that the first-band light sigal in the first wavelength band is transmitted through the first selected one of the bandpass light filters and a first reflected beam comprises all wavelengths of the input light beam except for the first-band light signal, thereby dropping the first-band light sigal from the first reflected beam.

4. The method of claim 1, wherein the step of first positioning includes the step of
    selecting the first selected one of the bandpass light filters to pass the first wavelength band and reflect all other wavelengths,
and the step of performing the first add/drop function includes the step of
    providing the input light bean not having therein the first-band light signal,
    reflecting the input light beam from a first side of the first selected one of the bandpass light filets to form a first reflected beam, and
    introducing the first-band light signal of the first wavelength band to a second side of the first selected one of the bandpass light filters, so that the first-band light signal is transmitted through the first selected one of the bandpass light filters and mixed with the first reflected beam, thereby adding the first-band light signal to the first reflected beam.

5. The method of claim 1, wherein the step of second positioning; includes the step of
    selecting the second selected one of the bandpass light filters to pass the second wavelength band and reflect all other wavelengths, and
the step of performing the second add/drop function includes the step of
    reflecting the input light beam from a first side of the second selected one of the bandpass light filters, so that the second-band light signal in the second wavelength band is transmitted through the second selected one of the bandpass light filters and a second reflected beam comprises all wavelengths of the input light beam except for the second-band light signal, thereby dropping the second-band light sigal from the second reflected beam.

6. The method of claim 1, wherein the step of second positioning includes the step of
    selecting the second selected one of the bandpass light filters to pass the second wavelength band and reflect all other wavelengths,
and the step of performing the second add/drop function includes the step of
    providing the input light beam not having therein the second-band light signal,
    reflecting the input light beam from a first side of the second selected one of the bandpass light filters to form a second reflected beam, and
    introducing the second-band light signal of the second wavelength band to a second side of the second selected one of the bandpass light filters, so that the second-band light signal is transmitted through the second selected one of the bandpass light filters and mixed with the second reflected beam, thereby adding the second-band light signal to the second reflected beam.

7. The method of claim 1, wherein the step of providing the optical fiber light transmission system includes the step of
    providing a dense wavelength division multiplexed system.

8. The method of claim 1, wherein the step of providing the optical fiber light transmission system includes the step of
    providing a coarse wavelength division multiplexed system.

9. The method of claim 1, wherein the step of providing the optical fiber light transmission system includes the step of
    providing
        a first light collimator, and
        a second light collimator,
    wherein the light path extends between the first light collimator and the second light collimator, and
    wherein the filter module is positioned so that the selected one of the group of bandpass light filters may be controllably positioned in the light path between the first light collimator and the second light collimator.

10. The method of claim 1, wherein the step of providing the filter module includes the step of providing the drive mechanism comprising
    a lead screw drivably connected to the movable support.

11. The method of claim 1, wherein the step of providing the filter module includes the step of providing the drive mechanism selected from the grew comprising
    a stepper motor, a DC motor, and a linear actuator.

12. The method of claim 1, wherein the step providing the filter module includes the step of providing the drive mechanism comprising a positional indicating device for indicating the position of the movable support.

13. A method for performing add/drop functions of light signals in an optical fiber light transmission system, comprising the steps of providing
an add/drop light signal junction having an input optical fiber, an output optical fiber, an add optical fiber, and a drop optical fiber,
a group of bandpass light filters, wherein each of the group of bandpass light filters is optically different from the other bandpass light filters and is operable to reflect a respective reflected wavelength band and transmit a respective transmitted wavelength band, and
a filter module positioned to selectively place any of the group of bandpass light filters into the add/drop light signal junction, the filter module comprising
a movable support on which the group of bandpass light filter is mounted, and
a drive mechanism operably connected to the movable support to controllably move a selected one of the bandpass light filters into the input light path;
accomplishing an add/drop function by
positioning a selected one of the bandpass light filters into the add/drop light signal junction using the drive mechanism,
directing an input light beam through the input optical fiber onto the selected one of the bandpass light filters,
performing the add/drop function on the input light beam relative to a first band light signal in a first wavelength band, and
removing the selected one of the bandpass light filters from the input light path using the drive mechanism, wherein the add/drop function may be any one of a light signal add, a light signal drop, or both a light signal add and a light signal drop; and thereafter
repeating the step of accomplishing using a different selected one of the bandpass light filters and performing the add/drop function on the input light beam relative to a second band light signal in a second wavelength band.

14. The method of claim 13, wherein the step of providing the group of bandpass light filters includes the step of
providing the group of bandpass light filters comprising thin-film light bandpass filters.

15. The method of claim 13, wherein the step of positioning includes the step of
selecting the first selected one of the bandpass light filters to pass the first wavelength band and reflect all other wavelengths, and and the step of performing the add/drop function includes the step of
reflecting the input light beam from a first side of the first selected one of the bandpass light filters, so that the first-band light signal in the first wavelength band is transmitted through the first selected one of the bandpass light filters and a first reflected beam comprises all wavelength of the input light beam except for the first-band light signal, thereby dropping the first-band light signal from the first reflected beam.

16. The method of claim 13, wherein the step of positioning includes the step of
selecting the first selected one of the bandpass light filters to pass the first wavelength bad and reflect al other wavelengths, and the step of performing the first add/drop function includes the step of
providing the input light beam not having therein the first-band light signal,
reflecting the input light beam from a first side of the first selected one of the bandpass light filters to form a first reflected beam,
introducing the first-band light signal of the first wavelength band to a second side of the first selected one of the bandpass light filters, so that the first-band light signal is transmitted through the first selected one of the bandpass light filters and mixed with the first reflected beam, thereby adding the first-band light signal to the first reflected beam.

17. A method for performing add/drop functions of light signals in an optical fiber light transmission system, comprising the steps of providing
an add/drop light signal junction having an input light path, an output light path, an add light path, and a drop light path,
a group of bandpass light filters, wherein each of the group of bandpass light filters is optically different from the other bandpass light filters and is operable to reflect a respective reflected wavelength band and transmit a respective transmitted wavelength band, and
a filter module positioned to selectively place any of the group of bandpass light filters into the add/drop light signal junction;
accomplishing a first add/drop function by
first positioning a first selected one of the bandpass light filters into the input light path at the add/drop light signal junction,
directing an input light beam on the input light path onto the first one of the bandpass light filters,
performing the first add/drop function on the input light beam relative to a first band light signal in a first wavelength band, wherein the first add/drop function may be any one of a first light signal add, a first light signal drop, or both a first light signal add and a first light signal drop, and
removing the first selected one of the bandpass light filters from the input light path; and thereafter
accomplishing a second add/drop function by
second positioning a second selected one of the bandpass light filters into the input light path at the add/drop light signal junction,
directing the input light beam on the input light path onto the second selected one of the bandpass light filters, and
performing the second add/drop function on the input light beam relative to a second-band light signal in a second wavelength band, wherein the second add/drop function may be any one of a second light signal add, a second light signal drop, or both a second light signal add and a second light signal drop.

* * * * *